United States Patent
Rodriguez

(10) Patent No.: US 7,865,498 B2
(45) Date of Patent: Jan. 4, 2011

(54) BROADCAST NETWORK PLATFORM SYSTEM

(75) Inventor: Alex O. Rodriguez, Boca Raton, FL (US)

(73) Assignee: Worldwide Broadcast Network, Inc., Loganville, GA (US)

( * ) Notice: Subject to any disclaimer, the term of this patent is extended or adjusted under 35 U.S.C. 154(b) by 300 days.

(21) Appl. No.: 10/252,806

(22) Filed: Sep. 23, 2002

(65) Prior Publication Data

US 2004/0059720 A1    Mar. 25, 2004

(51) Int. Cl.
    G06F 17/30    (2006.01)
(52) U.S. Cl. .................................... 707/711; 707/706
(58) Field of Classification Search ............... 707/1–6, 707/9, 10, 100–104.1, 200; 709/200–206, 709/217–219, 223–224, 230, 231; 715/500, 715/512–516, 526, 530
    See application file for complete search history.

(56) References Cited

U.S. PATENT DOCUMENTS

| | | | | |
|---|---|---|---|---|
| 5,523,800 | A * | 6/1996 | Dudek | 348/734 |
| 5,832,494 | A * | 11/1998 | Egger et al. | 707/102 |
| 5,852,822 | A * | 12/1998 | Srinivasan et al. | 707/4 |
| 5,950,201 | A * | 9/1999 | Van Huben et al. | 707/10 |
| 6,202,060 | B1 * | 3/2001 | Tran | 707/3 |
| 6,282,567 | B1 * | 8/2001 | Finch et al. | 709/219 |
| 6,484,199 | B2 * | 11/2002 | Eyal | 709/223 |
| 6,581,103 | B1 * | 6/2003 | Dengler | 709/231 |
| 6,668,377 | B1 * | 12/2003 | Dunn | 725/92 |
| 6,842,761 | B2 * | 1/2005 | Diamond et al. | 707/104.1 |
| 7,162,493 | B2 * | 1/2007 | Weiss et al. | 707/104.1 |
| 7,222,163 | B1 * | 5/2007 | Girouard et al. | 709/219 |
| 7,260,564 | B1 * | 8/2007 | Lynn et al. | 707/3 |
| 2001/0003184 | A1 * | 6/2001 | Ching et al. | 707/4 |
| 2002/0049727 | A1 * | 4/2002 | Rothkopf | 707/1 |
| 2002/0059589 | A1 * | 5/2002 | Park | 725/35 |
| 2002/0133486 | A1 * | 9/2002 | Yanagihara et al. | 707/3 |
| 2002/0198962 | A1 * | 12/2002 | Horn et al. | 709/218 |
| 2004/0045040 | A1 * | 3/2004 | Hayward | 725/135 |
| 2004/0068750 | A1 * | 4/2004 | Maa | 725/113 |
| 2005/0050163 | A1 * | 3/2005 | Cole et al. | 709/217 |

FOREIGN PATENT DOCUMENTS

GB        2367 224 A    *    3/2002

* cited by examiner

Primary Examiner—Debbie Le
(74) Attorney, Agent, or Firm—John C. Smith

(57) ABSTRACT

A multimedia search system that provides search results which may be in the form of multiple data types, including text, icon, audio, video, and/or multimedia. The system also provides the ability to preview data video associated with a potentially linkable Web site listed in the search results screen, without linking directly to the Web site, by previewing a video file from that linkable Web site on the search results screen. The searcher then has the option of linking to that Web site based on information delivered by the previewed video file. The user also has the ability to search using the numerical system in which a numerical index is used to access data which is hierarchically categorized and sub categorized in a station/channel/program structured environment. The user can directly access stations, channels, or programs using predefined numerical index numbers.

7 Claims, 6 Drawing Sheets

Search Results Screen Which Displays a Categorical Directory, and a Selectable Multimedia Display Window Search Results Screen Which Displays Stations, Channels, Programs, and a Selectable Multimedia Display Window Search Results Screen Which Displays Individual Multimedia Search Results in a Multimedia Display Window Search Results Screen Which Displays
Individual Multimedia Search Results in a Multimedia Display Window

BROADCAST NETWORK PLATFORM SYSTEM

BACKGROUND OF THE INVENTION

1. Technical Field

The present invention relates to a network search engine which provides search results in several forms, including a video only form, a text only form, an icon form, or a combination of media form types, including text and/or icons and/or multimedia. The search results can be multimedia only, with the user having the option of playing the entire multimedia search results item, or skipping to the next entry, etc. Alternatively, the search engine can display search results in a user's choice of text, or icons, or both with the ability to selectably display multimedia items. The system provides the searcher with the capability of first examining an introductory data item, such as an icon representing a multimedia file presented on the search screen, to determine whether to link to the Web site associated with that multimedia file. Once the searcher selects the icon, a multimedia file is streamed to the search results screen. After viewing the multimedia file, the searcher can then elect to link to the Web site which presented the multimedia file. The search engine provides for the integration (i.e., "plug-in") of streaming broadcasting signals and/or their file names, multimedia files, Web pages or domain addresses on the Internet or on any other public or private global computer network. The multimedia data platform is format independent in that it can present multimedia files having a variety of data formats, such as commercially available MPEG, AVI, etc., formats.

2. Background Art

With the advent of very large global computer networks, such as the Internet, individual users have an enormous amount of information available to them. Unfortunately, there is so much information available that it is difficult to locate the items which may be the most pertinent in terms of the user's interest. In response to this problem, a variety of search engines have been developed to assist users in locating the information they are seeking.

However, search engines are not charities. They are run by companies which seek to make a profit for the service they provide. Because they have always been the busiest sites on the Web, entrepreneurs were prepared to invest in search engines at the outset on the theory that a high-volume of traffic could be used to generate a revenue stream. As proprietors of search engines sought ways to generate revenue from the traffic at their web site, they found that direct payment by visitors was unpopular and would result in a substantial loss of traffic. As a result, search engines inevitably turned to alternative ways of earning revenue. One of the most effective methods of generating revenue is through advertisements placed on the Web pages. Search engines have found that companies are willing to pay for advertising space for a variety of services, such as placing the company's brand names on the web portal's screen and/or through the use of banner advertising. However, a disadvantage associated with this strategy is that Web users dislike advertising which impacts performance by consuming communication bandwidth. Another disadvantage associated with this type of advertising is that in difficult economic times, such as occurred with the collapse of many Internet companies, advertisers were reluctant to spend substantial amounts on banner advertisements. As a result, the generation of advertising revenue through direct placement of advertisements on search engine Web pages has become more difficult.

With the decline of advertising revenue from direct placement of advertisements, the operators of search engines have turned to alternative methods of charging website owners a fee. In particular, Web site owner's seeking to direct traffic to their sites are willing to pay search engine operators in return for boosting their rankings in search results. As a practical matter, an advertiser's ranking in the search results is critically important since it directly relates to the probability that the searcher will actually get to the advertiser's entry in the search results, and potentially visit the site. Likewise, the lower an advertiser's rankings are, the less likely it is that a searcher will visit their site.

The practice of paying for placement enables companies to ensure higher ranking for their sites than they might objectively deserve. Because of its effectiveness, the practice of paying for enhanced ranking position rapidly became widespread. Unfortunately, this practice introduces a substantial imperfection into the frictionless marketplace that the Web could become, because millions of naive users are being frequently directed to sites which have paid a premium for preferred placement, rather than to sites which may have more pertinent information. In theory, the Web makes it possible for customers to locate the best supplier, but it can only deliver on that promise if the search process is objective. When search results are artificially distorted by the paid alteration of ranking results, the Web is unable to deliver the best search results for the searcher, and instead becomes a tool for entities with more resources to effectively monopolize the marketplace. In addition to the use of artificially altered rankings as they relate to direct sales of products, paying for placement in search results also distorts the Web as a medium for the unfettered dissemination of ideas. For example, if powerful institutions such as governments and large corporations can influence the outcome of Web searches, they can effectively ensure that some voices are rarely heard.

A recent substantial change in Web use has been the rapid shift in the use of the Web by television broadcasters. Due to rapid increases in communications bandwidth, there is an increasingly large audience for high bandwidth Internet television. This usage is growing exponentially and represents an opportunity for television broadcasters to greatly expand their reach to the ultimate consumers of their products. It would be advantageous to have a method which allows an individual to have easy access to a multitude of broadcast outlets from a single Web portal. Today, there is intense competition by the developers of video content over video and multimedia standards. As a result, the current versions of these formats are often incompatible and the market suffers from their incompatibility. It would be desirable to have a network system capable of providing the necessary structure and application system to allow the various developing technologies, which are otherwise incompatible, to function together and provide rich new media, video, and multimedia content, and which further could be simultaneously presented as search results via a single search engine.

Another change in the nature of search engines has been the need to handle multiple types of data, in particular, video data. Recently, video producers and digital creators have witnessed a remarkable transformation in the tools that have begun to flood the current marketplace to create new content. Ten years ago, the ability to work with video data was reserved for those with access to high-end professional digital facilities. Today, digital video camcorders, personal computers and software tools can provide high quality content and production capabilities for a relatively nominal cost. When the personal computer was introduced, it was difficult to imagine that it would have such a profound effect on the professional video production industry. Those most threatened by this new technology argued that new tools running on off-the-shelf computers would never match the capabilities of the proprietary computer "Black Boxes" which were typical of the pre-PC year. They were wrong and we are now entering an age of video workstations. It would be desirable to be able to use the powerful new video technologies, which are now available today by both advertisers end-users, when they're using search engines.

For nearly two decades, the personal computer revolution has been riding an exponential growth curve, enabled by the phenomenon identified by Moore's Law, which postulates that the number of transistors available to a chip designer will double every 18 months. This has resulted in the development of nominally priced notebook computers which offer digital video production capabilities to virtually anyone. In addition, the multimedia products generated by these machines can be used on the Web by anyone who has a Web site.

Today we live in the infancy stage of the convergence of multiple media types. As a result, video data is now just another form of information. Anyone with the capability to produce video can also acquire a channel from a station that provides video streaming capabilities. The network broadcasting business is no longer defined by traditional broadcast platforms. It would be advantageous to have the ability to deliver any type of broadcast data on the Web and to provide traditional broadcast media via an entirely new technological area for delivery of their product. More importantly, it would be very advantageous to provide this video data as just another type of data that is presented as the result of a search.

One problem faced by Web sites is that the meta tags used by search engines today focus on text based information. Of course, a principal advantage of global networks, such as the Internet, is that they allow the transfer of large amounts of data through video or multimedia information. By focusing on textual data types, conventional search engines fail to take advantage of the inherent information rich media, which data types such as audio, video, and multimedia, provide. Currently, there are no meta tags specifically designed for use with icons, URLs for streaming multimedia data, or multimedia audio tags. In order to make this type of data available to search engines, the search engines would first have knowledge of, and access to meta tags specifically designed for those types of data. Unfortunately, these meta tags do not exist at present. It would be advantageous to provide a search system which is able to use multimedia meta tags that allow the search engine to search different types of multimedia data, and to provide a search results list that contains any combination of text, icons, audio, video, and/or multimedia.

Another disadvantage of conventional search engines is that they typically provide a list of potentially interesting sites with links to those sites. Unfortunately a substantial amount of time can be wasted in the linking process, only to find that the site which was linked to is of no interest to the searcher. Not only does linking to the Web site waste time and effort, sometimes the site which is linked to does not allow the searcher to return to the search list. This causes an even greater waste of the user's time by disrupting the search, which may have taken considerable time to execute; and, which now may have to be re-executed from the beginning. It would be advantageous to have a search engine that allows the searcher to examine data, including multimedia, audio, and video data from a potential linking site without actually leaving the search results Web page.

While the prior art has attempted to provide a variety of methods to search the Web, it has failed to provide a multimedia search system which provides meta tags to allow the search of multimedia, audio and icon data in addition to the text data available by conventional search systems. It has also failed to provide search results containing multiple data types, including text, icons, video, audio, and/or multimedia data into the search results list. It has failed to allow searchers to preview data (which may be an advertisement or information or promotional multimedia files) associated with linkable sites prior to linking to those sites. In addition, it has failed to allow search results to be presented in a variety of formats, including a conventional search list, or a multimedia search list that provides video as part of search results, or a multimedia network platform that uses a numeric index to access data.

SUMMARY

Figure 1:
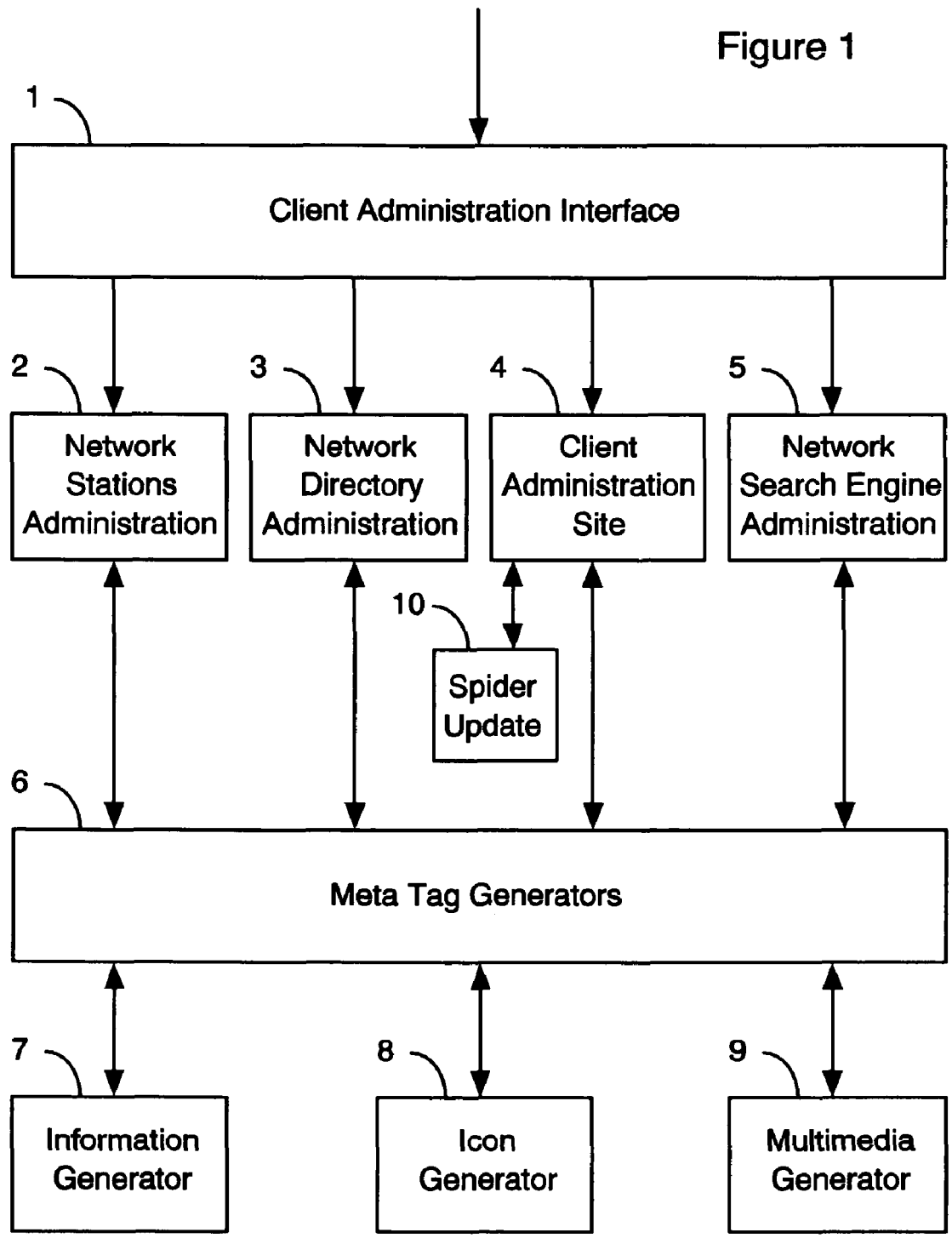
FIG. 1 is a block diagram that illustrates the interface between a client Web site and the search system.

The present invention solves the foregoing problems by providing a search engine with the ability to preview multimedia data associated with a potentially linkable Web site listed in the search results screen without linking directly to the Web site. A preferred embodiment displays multimedia search results entries in a window on the search results screen from a list of multimedia search results entries. The searcher has the ability to step from entry to entry based on information presented in the search results screen, or to link to the Web site presenting the data on the search results screen. In another preferred embodiment, the search engine provides an icon that is displayed on the search results screen and which can be selected to cause a multimedia file from the linkable Web site identified by the icon to be streamed to the search results page for display, or alternatively the searcher can link directly to the linkable Web site associated with the icon. Another preferred embodiment provides a text list which allows the searcher to display a multimedia file based on text presented on the search results screen, or to link directly to the linkable Web site associated with a text search results entry. In each of the embodiments, the searcher has the option of previewing multimedia information on the search results screen to determine if the user wishes to link to another Web site, and then selectably linking to the Web site based on the information delivered in the previewed multimedia file.

The system uses novel meta tags specifically designed to identify and locate multimedia data, including streaming multimedia video data. The meta tags identify the location of information on remote Web sites which may include general information about the Web site, and in addition, the addresses where multimedia files, which are to be downloaded and displayed on the search results screen, can be found. The meta tags are created and stored on the remote Web site. The owner of the remote Web site accesses the search engine Web site and issues instructions to have a spider access the remote Web site system for the purpose of retrieving the information in the meta tags. This gives the owner of the remote Web site control over the content of the meta tags, and also gives the owner of the remote Web site control over when the search engine is updated with the content.

The system provides a number of search capabilities to deliver search results in an organized and synchronized fashion. The user may specify the style of the views, including the arrangement of the views provided by the system. The views may include multimedia, multimedia and text, icons, icons and text, text, etc. The user may input search keywords to the system which searches the Web and locates information and Web sites associated with those keywords. The system displays a selection of views which allow the searcher to choose the format of the search results. The format of the search results may be multimedia, multimedia text, icons, icons and text, text, or combinations of the foregoing. The user selects views from user-customized favorite program files, and several graphic display and search switching capabilities within the application. In addition, an optional advanced Internet multimedia and broadcast management network platform system permits users to access information on the Web by means of a numerical index system in which multimedia broadcasting sources provide numerical addressing information related to a station/channel/program structured environment. Each station, channel, or program contains a destination address for a source text, icon, audio, video, and/or multimedia file for one or more programs. The user enters a preselected numerical code to access a selected station/channel/program.

DESCRIPTION OF THE PREFERRED EMBODIMENT

Prior to a detailed discussion of the figures, a general overview of the system will be presented. The system provides a new method of searching and displaying a variety of conventional data types (e.g., text) as well as alternative data types, such as audio, video, multimedia streaming data, large and small icons, as well as combinations of those data types. The variety of data provided by the system is presented as results on the search screen, and which may be selected by the searcher for the searcher's examination. The system is able to identify a variety of data types to the search engine by the creation of a set of new meta tags which provide destination addresses for these multimedia data files on the Web. By having the ability to access multiple types of data, the system provides the searcher with substantially more information than would be presented by a conventional text based search system.

Another advantage provided by this invention is the ability of the searcher to select a multimedia file, such as a streaming audio/video file, and to access that multimedia data file at its location on the Web and display it in a window on the searcher's search results screen. Streaming the multimedia file to the search results screen eliminates the need for the searcher to link to the source site to find out whether that site contains information of interest. The host of the Web site provides streaming data to the searcher's page which is presented in the window. After the searcher views the information presented by the streaming data, the searcher can elect to link to that site. This eliminates a number of problems associated with prior art search engines. In particular, it eliminates the problem associated with Web pages that do not, for one reason or another, allow the searcher to return to the search results page. Frequently, this results in the searcher having to re-execute the search which may result in substantial wasted time. Of course, when the searcher reenters the search keywords, those keywords may be slightly different, which will result in different search results. In addition, streaming a small advertisement or description of a tentative linkable site will improve system performance by avoiding the overhead associated with linking to that site and then having to return.

As can be seen, the system provides a search engine which has a search results screen that combines multiple data types, including text, audio, video, multimedia, icons, etc. into a single search results screen that provides far richer data than previously available. In addition, the preview capability associated with multimedia data, which is streamed for a direct presentation on the search results Web page, provides increased convenience and improved performance over prior art systems which require searchers to link to a Web page listed as part of the search results. The multimedia data allows substantial amounts of information to be quickly presented to the searcher, and avoids interference with the search by linked-to Web pages which do not allow return to the search results Web page.

The system further improves upon prior art search engines by providing a new method of accessing data. In particular, an optional numerical index system allows a user to input a number related to a station/channel/program format which provides search results that are categorized and sub categorized by subject matter to allow the searcher to quickly locate potential Web sites of interest. The station/channel/program format used by the system is implemented as follows:

1. A Web site proprietor would advertise its Web site and include a numerical address code in the advertisement. For example, a large electronics company may advertise the product, such as an inkjet printer with a code of 2.1.3 wherein a number 2 may indicate a station, the number 1 may indicate a channel, and the number 3 may indicate a program.
2. A "Station" may represent a Web site which has a variety of content and which may include multiple channels and programs within those channels. For example, if an individual is looking for an electronic product such as a computer printer, the numerical code for the station may list the home page of a large electronics manufacturer that has a broad range of products. That home page would function as the station that would provide access to a variety of channels, each related to different product categories. One channel may be related to printers, one to display monitors, one to notebook computers, etc. This is an improvement over the prior art in that it provides a short identification code which is much easier for a consumer to remember.
3. A "channel" can represent a category of related items. Once a searcher has selected a station, the searcher would then use the numerical code 1 (which may indicate printers) to select the appropriate channel within the station. Using the example given above, the searcher would access the Web site of a manufacturer which is the station, then access the channel related to printers.
4. A "program" represents a particular item within a category. Again, using the example given above, once the printer channel is selected, each program may be related to a particular printer within a line of printers. The searcher would then use the numeral 3 to select the program (i.e., the printer) the searcher was interested in.

By way of example, a large manufacturer such as Sony Corporation may use an Internet address on its advertisements related to products that it sells. If Sony was advertising a specific type of television (e.g., an HDTV television), with a specific model number (e.g., a model 301), the advertisement may have a spelled out Internet address so that the consumer can later access the Internet for more detailed information regarding the product. In this case, the spelled out Internet address may have a form such as "WWW.Sony.com/HDTV/model-301" which would indicate the address of the Sony Web site, the subsection of the Sony Web site devoted to high-definition televisions, and the particular Web page devoted to that particular model of high definition television. The problem associated with this type of Web page identification is that the addresses can be long and cumbersome. Long addresses such as this can be difficult to remember and can contribute to mistakes on the part of the consumer entering the address. For example, the dash in the term "model-301" might be easily forgotten or omitted by the consumer, which would result in the consumer not being able to get to the correct Web page. Quite often, when this happens a consumer will become frustrated and not pursue obtaining the information that the manufacturer may wish to present. In turn, this may result in the loss of sales.

The advantage provided by the invention is that by using the abbreviated station/channel/program address structure, the Web site address can be reduced to an address which is much easier for the consumer to remember. In particular, if the station address for Sony Corporation is the number 1, and the channel address for Sony's line of HDTV televisions is the number 3, and the program address for their HDTV model 301 is the number 2, then the numeric addressing provided by this invention would use a code 1.3.2 to indicate the address of their Web page for the model 301 HDTV. As can be seen, the number 1.3.2 is far easier for an ordinary individual to remember than the extended Web address ("WWW.Sony.com/HDTV/model-301") for that Web page. By using the numeric addressing system presented herein, it is easier for the consumer to remember Internet addresses presented in advertisements, and it eliminates frustration caused by addressing errors which may in turn cause the consumer to abandon efforts to locate the Web site.

Those skilled in the art will recognize that the station/channel/program architecture used above can be used in conjunction with any type of subject matter.

Another feature of the invention, which improves over the prior art, is the addition of several new meta tags (discussed more fully below) which are used by the search system to define multimedia data, and icon data. These meta tags are used by the search engine to provide new types of data as a result of the search. When the search engine identifies specific multimedia types (e.g., text, digital image, audio, video, multimedia, icons, streaming multimedia, etc.) through the use of the new meta tags, the system can display search results which include icons that represent any or all of the different data types as items in the search results.

By using the station/channel/program format in combination with the new multimedia meta tags, the search engine presents the user with search results that are categorized based on related subject matter (e.g., science, finance, politics, etc.). In addition, the search results can be presented as text material, still video images, icons, full motion video, multimedia video, and/or audio. In addition, the system also provides the user with the ability to select a program in the search results list and link directly to the Web page represented by that program, or alternatively, to initiate the presentation of a multimedia file on the current Web page by selecting an icon in the search results list. Once selected, the multimedia file is streamed to a window on the search results page. After viewing the multimedia file, the searcher can then decide whether to move on to another item in the search results list or to link to the Web site page associated with the multimedia file. This provides the searcher with a flexible and rapid method of examining results of the search. In particular, the multimedia file acts as an advertisement and/or an introductory presentation which allows the searcher to make a decision as to whether a site is worth visiting. Likewise, in place of the multimedia file, an icon can be selected that results in an audio file being played, or in video images being displayed in the window on the search results screen, or even text messages being displayed within the window.

As can be seen, the system disclosed herein provides a system platform for the integration and "plug-in" of broadcasting signals and/or video, audio, or multimedia files, Web pages or domain addresses as items in a list of search results. Various methods and systems for the handling of broadcast signals, files, web pages, multimedia files, and file names are also disclosed. An exemplary method includes: (1) the ability to switch signals, streams, files and file names in a systematic platform; (2) a modifiable network of stations, channels and programs providing rich multimedia data; (3) a hierarchical directory system categorizing results in multimedia, video, audio, new media and graphical displays; and (4) a search conducted using keyboard query searches resulting in commercial multimedia, video, audio, new media and graphical displays presented on the search results screen.

The invention provides a search system that enables integration of multimedia from various sources into one central platform by providing an open platform where Web sites can plug in as stations to broadcast multimedia, video, and digital rich media channels. The system numbers, categorizes, and classifies destination source files (i.e., broadcast data files, and other data types). The system systematically categorizes, and classifies the destination files into related groups containing multimedia content which allows the user to graphically and interactively search through a series of searchable subdirectories containing data from a variety of Web sites.

The invention organizes the destination files containing multimedia content into a station/channel/program structure with similarly categorized data presented as programs in the same channel. This allows the user to be able to switch channels to step from one type of subject matter to another. Once a channel is selected, the user can then step from one related program to another. As a result, the user can graphically and interactively search through collections of sites represented having multimedia and video data with related subject matter. Each channel then categorizes and classifies related data that results in "programs within the channel."

The search system also allows the user to search the Web using a keyboard query. The search results are grouped into subject matter related stations and channels which the user can review, and then to perform the more detailed review of the programs within a channel. Each program represents a particular Web site or Web page. The system contains links to each of the Web sites and allows multimedia information to be presented on the search results screen for the purpose of enabling the user to determine if the user wishes to visit that site. In the preferred embodiment, multimedia information from a particular Web site can be presented on a portion of the search page to allow the user to determine if they want to exit the search page to visit the Web site associated with the multimedia information.

The broadcast network platform system which provides the search function uses several components. In order to properly categorize a particular Web site so it can be associated with a channel that contains related data, the system must first obtain data from the various Web sites which are to be searched. This function is performed by the Meta Tag Spider ("MTS") application. The MTS spiders the selected URL addresses and collects meta tag data and stores it in a Web site database which contains descriptions of the various Web sites. Meta tags and URL addresses are well-known in the art. However, meta tags as currently used by the prior art are limited to text data and do not provide any method of handling the types of data, such as multimedia, audio, icons, etc., which are needed to implement the invention. The multimedia related meta tags and icons provided by this invention allow the system to search multimedia items in the same manner as text items are searched in the prior art. Once the MTS has completed the process of obtaining descriptions of the various Web sites, the Web site database has information which will allow each Web site to be placed into categories which relate to the various channels.

Another important part of the invention is the search system. The search system is an application that allows users to enter predetermined search keywords and provides a list of results containing site information and media elements pertaining to each Web site. The search system uses the Web site database to determine which channels are related to those keywords, and which Web site entries in the database are also related to those keywords. As a result, when the user performs a search, the resulting Web sites are each displayed in the appropriate channel with other Web sites having related data. In the process of determining the order of display, the search engine can then arrange the resulting programs in any appropriate order.

Another part of the system is the network station application which designates Web sites as stations in the network platform. Each station may maintain one or more channels which may also contain one or more programs. The client uses the network station application to control a variety of options related to stations belonging to the client. The client may use the network station application to add additional stations, or to alter options and/or information related to a particular station. When the client purchases a station, the client will enter a variety of information related to that station including the station title, the station description, and station keywords. These keywords are used by the search engine to determine if the station is related to the subject matter being searched. In addition, the client is also able to enter file destination source addresses related to icons as well as destination source addresses related to multimedia data. The network station application also links to the meta tag generator (discussed more fully below) for the purpose of creating meta tags that describe the station. The meta tag generator creates the meta tags later used by the search engine to identify desired stations.

Another part of the system is the Directory System application. This application categorizes Web sites by providing category search parameters. From here the client can select a particular category of subject matter that best describes a particular site. The client can then enter title information, site description information, site keywords, icon destination source file addresses, and multimedia source file addresses. By providing the client the ability to describe stations and channels in this manner, the system is able to conduct searches of all stations, or alternatively, to conduct a search within a single channel. Due to the meta tags provided by the invention, the search can be made against not only text, but also against multimedia files. Once the search has been completed, the linkable sites have the option of providing icons which can be used to access multimedia files that are displayed on the search results screen to enable the searcher to determine whether or not the searcher wishes to link to that site.

The Visual Client Interface ("VCI") is used by Web site owners. It allows a client to purchase services from the system. For example, a client can order one or more stations and which the client can then administer directly. The client can select destination source files of multimedia content, description of files, subject matter, company information, product information service information, and the necessary information regarding the destination source file. The same destination source files may be associated with more than one station or channel based on the content within that destination source file. For example, destination source files related to hybrid engines for automobiles may be placed in one category related to automobiles, in a second category related to the environment, and in the third category related to tax exemptions for economical automotive fuel systems. The VCI is used by information providers (i.e., the clients) to include information used as keywords that are matched against keywords input to the search system when searching, and also to provide the information and data which is presented the users as a result of the search.

The Multimedia Meta Tag Generator ("MMTG") is an application that generates the source code necessary to allow the Meta Tag Spider to spider and retrieve the Meta Tags related to a specific program. The term "spider," as used herein, is well known in the art. When a client initializes, or later updates, information related to the client's Web site, the meta tags used to describe the client's Web site and the destination files therein are set up by the client through the use of the meta tag generators. Once these meta tags are created, or modified, they are available to the search engine which uses them to determine which destination source files would be of interest to a searcher based on the searcher's keywords. Meta tags can provide information related to a Web site, provide information related to icons, and/or provide information related to multimedia files. Once meta tags have been created or modified on one or more of the client's Web sites, the client can then log onto the search engine Web site and instruct it to use the meta tag spider to access the client's Web sites and extract data from the meta tags for use by the search engine. An advantage of the new meta tags is that the system can now search not only text data, but also icon, audio, video, and multimedia data files.

Once the client has provided the information required by the system to conduct a search, and the system has gathered that information via the spider, the client's Web site and information are now available to a user conducted search. The Visual User Interface ("VUI") is a visual interface used by an individual who is conducting a search. The VUI allows the user to input keyword parameters that define the search criteria used by the search engine to identify the destination file names which represent the programs associated with a particular channel.

Desktop Internet Management System ("DIMS") is an application that allows users to customize the sites preferred by the users in a categorized and hierarchical system. The DIMS application allows the user to access user account information, such as email, time planners, events counters, and communications notices. In addition, from the DIMS application, the user can access and control a personalized menu or a tools menu. The personalized menu provides a convenience for the user which allows the user to access personal sites, business sites, financial sites, educational sites, government sites, entertainment sites, health sites, etc. If the user accesses the tools menu, the user is able to control a variety of features related to the search system, and to control how the results of a search are presented.

The system has the following advantages: it allows commercial multimedia and Web site information to be selected as the result of user defined input and/or a queried search criteria. The system can be used in conjunction with other portals, search engines, and/or directories. The system can be integrated with other search portal technologies. It can systematically organize, classify, distribute, and display in a systematic manner a variety of multimedia and video content on the Internet. The clients can control how their Web sites are classified for the purposes of a search. In addition, they can now use new meta tags to allow multimedia files to be searched in the same manner as text files, and to present multimedia advertisements or samples on the search results page to entice a user to visit their Web site. Likewise, users can control what categories they wish to see and how they want the search results to be presented. As a result, both the client and the user have greater control of how search results are presented. In addition, multimedia data can be streamed directly to the search page without requiring the user to link to the Web site represented by an icon in the search results.

The network platform system embodiment is as follows. There are a number of broadcasting network stations that consist of individual broadcasting channels. The system designates channel id parameters and program id parameters within channels. In particular, station networks are sites providing streaming video and audio, multimedia content and multimedia, media files and file names. Programs are individual items within the network channels. Any channel can have an unlimited number of programs having video, multimedia, audio, or other content or programming. These stations, channels, and programs may be accessed by numerical indexing, as discussed above.

The invention provides several advantages. It solves the long filename problem, discussed above. It allows not only text to be searched, but also icon, audio, video, and multimedia files to be searched. It provides the capability of inserting rich multimedia files, audio files, video files and/or icons into the search results list, resulting in rich multimedia query results. It provides the searcher the ability to view a multimedia file related to a selected search result without requiring the searcher to link to the Web site associated with the multimedia file. Having discussed the invention in general terms, we turn now to a more detailed discussion of the figures.

FIG. 1 illustrates the methods used by a client to control how the system would determine that the client's site should be presented to a user as a search result item. When a client decides to update information related to the client's site, the client accesses the system via the system's Web site. When the client first enters the system's Web site, the client initially accesses the Web page on the system's Web site which represents the client administration interface 1. From the client administration interface 1, the client can perform any actions necessary to manage the client's data which is presented to users as the result of a search. The first action taken by the client at this Web page is to log on to the system. Once the client has logged on and is recognized by the system, the client can then access a list of services on the client administration interface 1 Web page. The services available to the client from this Web page are the network stations administration 2 Web page, the network directory administration 3 Web page, the client administration 4 Web page, and the network search engine administration Web page 5.

From the client administration interface 1, the client can access the network stations administration 2 Web page, which has several functions. In particular, the client can select options related to material presented to the system as part of the station. The client can specify one or more channels which are to be associated with a particular station. In addition, the client can specify one or more programs which are to be associated with particular channels within the station. The client can also select multiple channels in the cases where the subject matter can appropriately be associated with more than one channel. In the preferred embodiment, the client would purchase space on each channel the client desired. The client would also enter general information here, such as program title, program description and keywords used to locate the program during a search. The client can also define the address of an icon associated with a particular item. The icon will eventually be displayed on the search results screen to provide easier access for the user. From this screen, the client can also enter the destination source address for any multimedia data which the user may access from the search results screen. The information provided by the client is input to the meta tag generators 6 from this page. The meta tag generators 6 are used to create meta tags which provide information related to the client's stations that is used by the search engine during a search.

If the client accesses the network directory administration 3 Web page, the client can access several functions for use with any Web sites owned by the client. From here, the client would select the category that best describes each site's classification. For each site, the client may add a variety of information, including site title information, site description information, site keywords, icon destination source file location information, and/or multimedia source file location information. This information is also input to the meta tag generators 6 to create meta tags which are ultimately used by the search engine.

If the client accesses the client administration site 4 Web page, the client can access several other functions. In particular, after the initial activation of a client program (e.g, multimedia file, Web site, software program, etc.), the client will use the client site information update 4 Web page to update the information related to that program whenever changes are made to the site holding the client program information. The client can add information related to the program including title, description information, keywords, icon destination source file location, and/or multimedia source file location information. An advantage associated with this update process is that it provides a simple method the client can use to directly control how its entries are searched.

In normal use, the meta tag generator 6 is accessed by the network directory administration 3 and the client administration site 4 uses the information generator 7 to update the meta tags having site information. The icon generator 8 is used by the client administration site 4 to generate icons related to the client program. Likewise, the multimedia generator 9 is used by the client administration site 4 to generate meta tags related to multimedia files used by the client program. The client interfaces to the system website allow the client to add, delete or update all aspects of meta tags used by the system search engine. As a result, the client has direct control of how the client's information is searched.

If the client accesses the network search engine administration 5 Web page, the site title, site description, site keywords, site icon and site multimedia files can be set up for any programs provided by the client. This information will be directly searchable via the user's network directory, discussed below.

The following is an example of preferred embodiments of document, small icon, large icon, audio, and multimedia META tags:

```
<head>
<title>My Document</title>
<meta Name="Description" content="This is my document">
<meta Name="Keywords" content="My document, my name and my keywords">
<meta Name="Small icon url" content=""http://www.mysite.com/mysicon.ico">
<meta Name="Large icon url" content=""http://www.mysite.com/mylicon.ico">
<meta Name="Audiourl" content=""http://www.mysite.com/mystream.wav">
<meta Name="Mmurl" content="http://www.mysite.com/mystream.mov">
</head>
```

Those skilled in the art will recognize that the foregoing examples of meta tags are provided for illustrative purposes only. Any number of data types, or data type names, or combination of the above can be defined by the meta tags in place of the examples provided above. Therefore, the particular structure of the meta tags given above does not limit the number of meta tags that are potentially available. The only requirement is that the meta tags provide information related to a variety of data format types, and/or are also capable of providing information related to the location of those in data types on remote Web sites. Likewise, those skilled in the art will recognize that a particular Web site would not necessarily require all potential meta tags. Typically, an appropriate mix would be selected which would reflect the particular types of data that the remote Web site wishes to present.

Also shown in this figure is the spider update 10. When the client activates the spider update 10 for a Web site, the spider will access the URL for that Web site, access that Web site, and retrieve the meta tag information related to that site and provide it to the search engine database so that is available for future searches. As can be seen, the client administration interface 1 allows the client to directly control information used by the search engine to perform a search, and allows the client to select and make available advertising or invitational multimedia files for use by the search engine on the search engine's results page.

Figure 2:
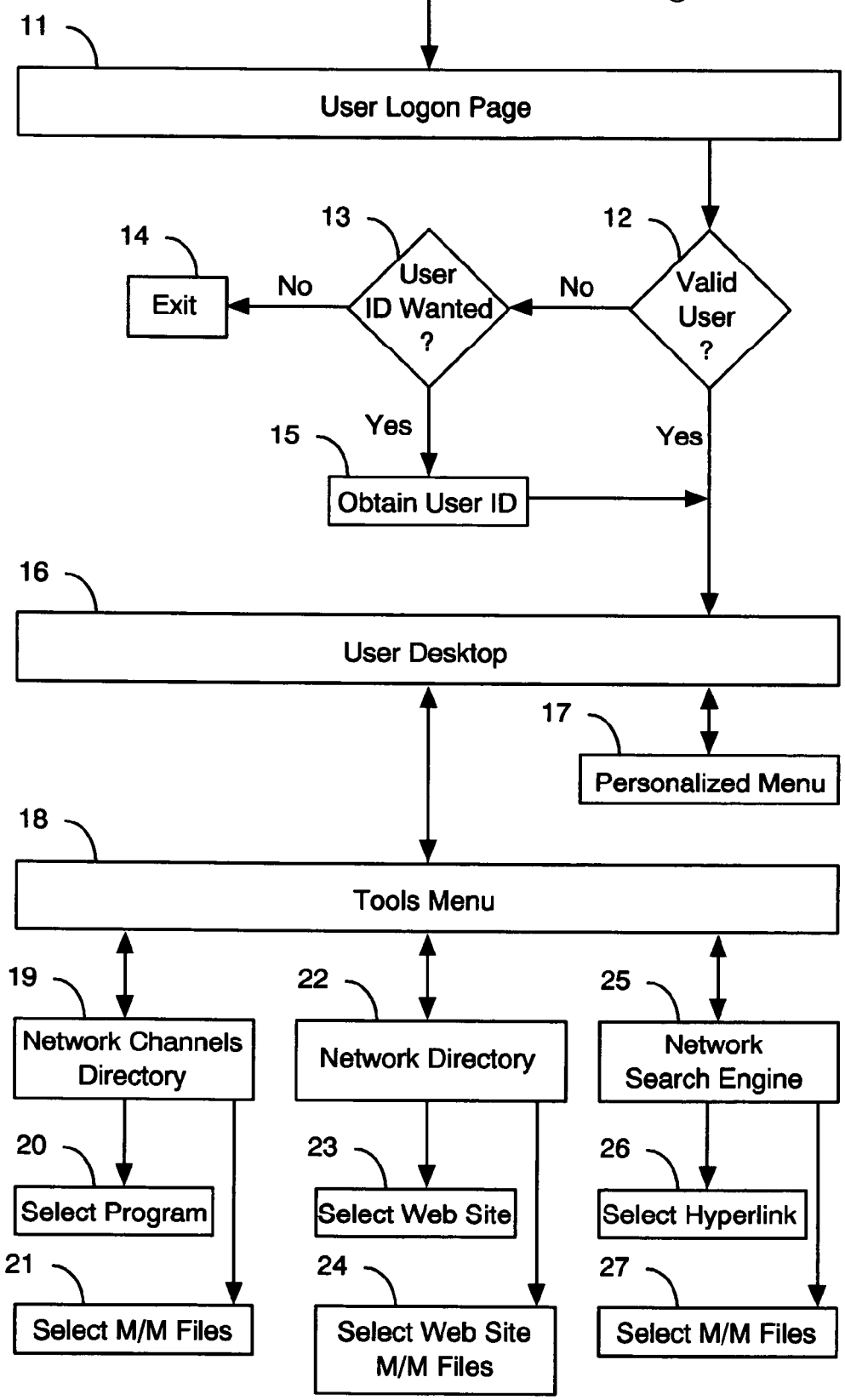
FIG. 2 is a block diagram that illustrates the interface between a user and the search system.

FIG. 2 illustrates how a user conducts a search and accesses information in the search results. When the user accesses the system Web site, the first step is to enter the user logon page 11. At this point, the system queries the user at step 12 to determine if the user is authorized to enter the search system. If the user has a valid user id, then the user proceeds to the user desktop at step 16. If the user does not have a valid user id, an offer is extended to obtain one at step 13. If the user declines, then access to the system is terminated at step 14. If the user elects to obtain a valid user id at step 15, then the user may access the user desktop at step 16.

From the user desktop at step 16, the user may access either the user's personalized menu at step 17 or the tools menu at step 18. If the user accesses the user's personalized menu at step 17, that menu provides the user with selected links and data, such as the user's personal sites, business sites, financial sites, educational sites, government sites, entertainment sites, health sites, etc. In a preferred embodiment, each site will be represented by an icon. When the user selects an icon that represents a site or data source, the system will link to that site or access that data source.

In the event the user selects the tools menu 18, the user can access the network stations directory 19, the network directory 22, or the network search engine 25. If the user selects the network stations directory 19, then the user searches stations, channels, and programs. The user can view the search results as follows: the user can select from a list of icons at step 20 which contain information related to the Web site, or the user can select an icon at step 21 which contains information related to a multimedia file. If the icon at step 20 is selected, then the user will link directly to the Web site represented by the selected icon. Alternatively, the user can directly view multimedia files which are selected by control buttons on the search screen and which allow the user to move from one multimedia file to another. If the user selects the multimedia files option at step 21, then a multimedia file will be streamed and presented in window 36 on the search results page. This multimedia file will have information designed to invite the user to link to the source Web page. It may be in the form of an advertisement, an informational message, etc. The multimedia display window 36 provided by the invention allows a user conducting a search to conveniently review information about the Web page which forms part of the search results without having to go to the Web page itself. The clients who own each Web page in the search results also enjoy an advantage with this invention in that they decide what type of message will be presented in the search results page multimedia window. Therefore, they have control over an important marketing tool.

If the user selects the network directory 22, the user is presented with a list of categories and sub categories which relate to specific subject matter areas. The user can examine the list of categories and decide which categories are of interest.

The following illustrates an exemplary root directory structure consisting of ten named categories:

| | |
|---|---|
| 1. | Applications |
| 2. | Business & Economy |
| 3. | Communications & Internet |
| 4. | Arts & Entertainment |
| 5. | Leisure & Recreation |
| 6. | Government |
| 7. | Reference & Information |
| 8. | Services |
| 9. | Shopping |
| 10. | Education |

An advantage of the present invention is that the system utilizes the search engine to search for keywords or phrases within the root directory system which have either a text or multimedia content result according to user's choice. In addition, the users can search by keywords or phrases in the main directories of the root directory, targeting the search to the selected main directory for more accurate results. Further, users can search by keywords or phrases in the sub directories to the main directories, targeting the search to the selected sub directory for more accurate results within each sub directory defining the search criteria. The system adds, on an as-needed basis, sub categories to the main categories in the root directory. Example of current directories and their respective sub-directories are as follows:

| | | |
|---|---|---|
| 1. | Applications | |
| | a. | Business Application |
| | b. | Home Management |
| | c. | Personal Management |
| | d. | Graphics |

-continued

|   |     |                               |
|---|-----|-------------------------------|
|   | e.  | Web Design                    |
|   | f.  | Video Editing                 |
| 2.| Communications and Internet |     |
|   | a.  | On line chats                 |
|   | b.  | Wireless WAP                  |
|   | c.  | Communities                   |
|   | d.  | Directories                   |
|   | e.  | Portals                       |
|   | f.  | Search Engines                |
| 3.| Leisure and Recreation |             |
|   | a.  | Sports                        |
|   | b.  | Dining                        |
|   | c.  | Hobbies                       |
|   | d.  | Travel                        |
|   | e.  | Dancing                       |
|   | f.  | Adult                         |
| 4.| Reference |                              |
|   | a.  | Dictionaries                  |
|   | b.  | Encyclopedias                 |
|   | c.  | People & History              |
|   | d.  | Science & Technology          |
|   | e.  | Health & Medicine             |
|   | f.  | Maps & Atlas                  |
|   | g.  | Pets & Animals                |
|   | h.  | Educational                   |
| 5.| Shopping |                             |
|   | a.  | Department Stores             |
|   | b.  | Postage & Shipping            |
|   | c.  | Malls                         |
|   | d.  | Shoes & Clothing              |
|   | e.  | Office Products               |
|   | f.  | Transportation Products       |
|   | g.  | Sporting Goods                |
|   | h.  | Pets & Supplies               |
|   | i.  | Jewelry                       |
|   | j.  | Discounters                   |
|   | k.  | Auctions                      |
|   | l.  | Eye Wear                      |
|   | m.  | Cosmetics                     |
|   | n.  | Pharmacies                    |
|   | o.  | Toys                          |
|   | p.  | Movies, Music & Books         |
|   | q.  | Consumer Electronics & Appliances |
|   | r.  | Computing                     |
|   | s.  | Foods & Groceries             |
|   | t.  | Home & Gardening              |
|   | u.  | Hardware Products             |
|   | v.  | Business To Business          |
|   | w.  | Gifts & Flowers               |
|   | x.  | Liquidation Sales             |
|   | y.  | Art & Graphics                |
|   | z.  | Hobbies                       |
| 6.| Business and Economy |                 |
|   | a.  | Trade Associations            |
|   | b.  | Chambers of Commerce          |
|   | c.  | Wholesale & Distribution      |
|   | d.  | Charitable Organizations      |
|   | e.  | Corporate Web sites           |
|   | f.  | Business Opportunities        |
| 7.| Arts & Entertainment |                 |
|   | a.  | Adult                         |
|   | b.  | Children                      |
|   | c.  | Games                         |
|   | d.  | Literature                    |
|   | e.  | E-Books                       |
|   | f.  | Comedy                        |
|   | g.  | News                          |
|   | h.  | Music                         |
|   | i.  | Movies                        |
|   | j.  | WebCams                       |
|   | k.  | Virtual Reality               |
|   | l.  | Newspapers                    |
|   | m.  | Magazines                     |
|   | n.  | Television                    |
| 8.| Government |                           |
|   | a.  | Departments                   |
|   | b.  | Military                      |
|   | c.  | Offices & Bureaus             |
|   | d.  | Politics                      |

-continued

|   |     |                               |
|---|-----|-------------------------------|
| 9.| Services |                             |
|   | a.  | Business Services             |
|   | b.  | Home & Family Services        |
|   | c.  | Health & Fitness              |
|   | d.  | Financial Services            |
|   | e.  | Legal Services                |
|   | f.  | Internet & Communications     |
|   | g.  | Travel Services               |
|   | h.  | Consumer Services             |
|   | i.  | Educational Services          |
|   | j.  | Auto & Truck Services         |
|   | k.  | Online Photo Development      |
|   | l.  | Shipping & Delivery           |

Another advantage of the invention is that it can use the search engine to search for keywords or phrases within each sub directory of the system, providing either a text or multimedia content result according to user's choice, also providing a more targeted and defined search within the searched sub directory since the keywords will only pertain to the subdirectory being searched.

The user can select a Web site link at step 23 which will link directly to the particular Web site. Alternatively, the user can select an icon related to a multimedia presentation representing a Web site at step 24. When this alternative is used, the system streams a multimedia presentation from the Web site which is displayed to allow the user to decide whether or not the user wishes to access the Web site that provided the multimedia presentation. The user can then click a button 37 to link that site, if desired.

The user's other option is to select the network search engine at step 25. The user enters a series of keywords that are used as input to a search and a series of search results are presented as icons. The user can select an icon at step 26 or select a multimedia presentation representing a Web site at step 27.

Figure 3:
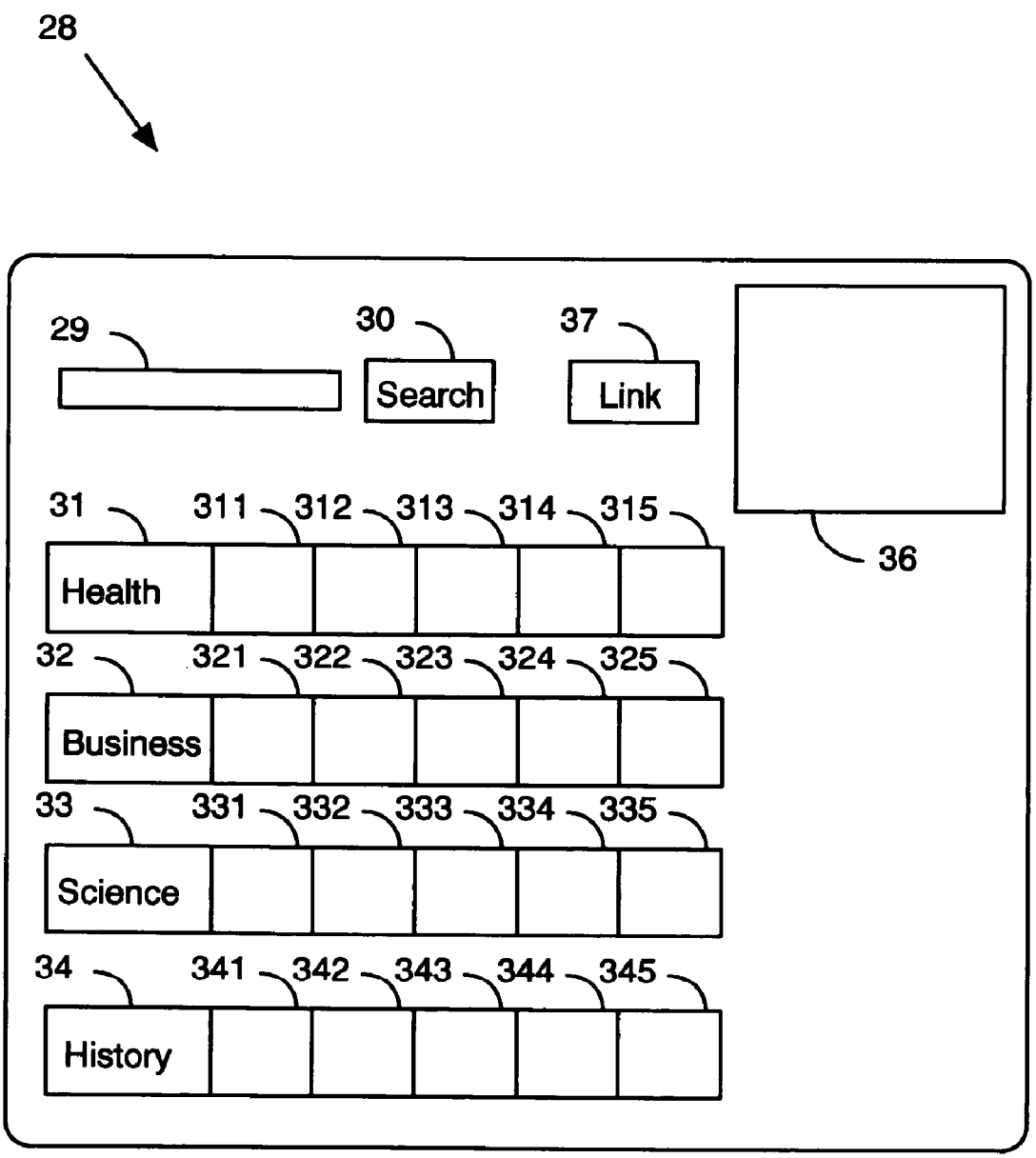
FIG. 3 is an illustration of a preferred embodiment of a network platform search results screen which displays a categorical directory, and a selectable multimedia display window.

FIG. 3 illustrates an optional preferred embodiment of a multimedia directory system which includes icons and multimedia files in the search results. When the user conducts a predetermined selection by category and sub categories to find information in relation to specific subject matter in relation to the category and sub category, the user can then view multimedia files within the selected category or sub category to preview site information and further determine if the site coincides with the subject matter the user wishes to review or to access. Each station 31-34 is associated with a particular subject matter category (e.g., health, business, science and history). Of course, there is no limit to the number of subject matter categories that can be established and searched. If an icon represents a multimedia file, it can be selected for display in window 36. This feature allows the user to preview the information available from a Web site found by the search in relation to the subject matter selected by the user. If the site appears to be of interest to the user, the user can then select button 37 to directly link to the Web site which streamed the multimedia presentation to the window 36.

Figure 4:
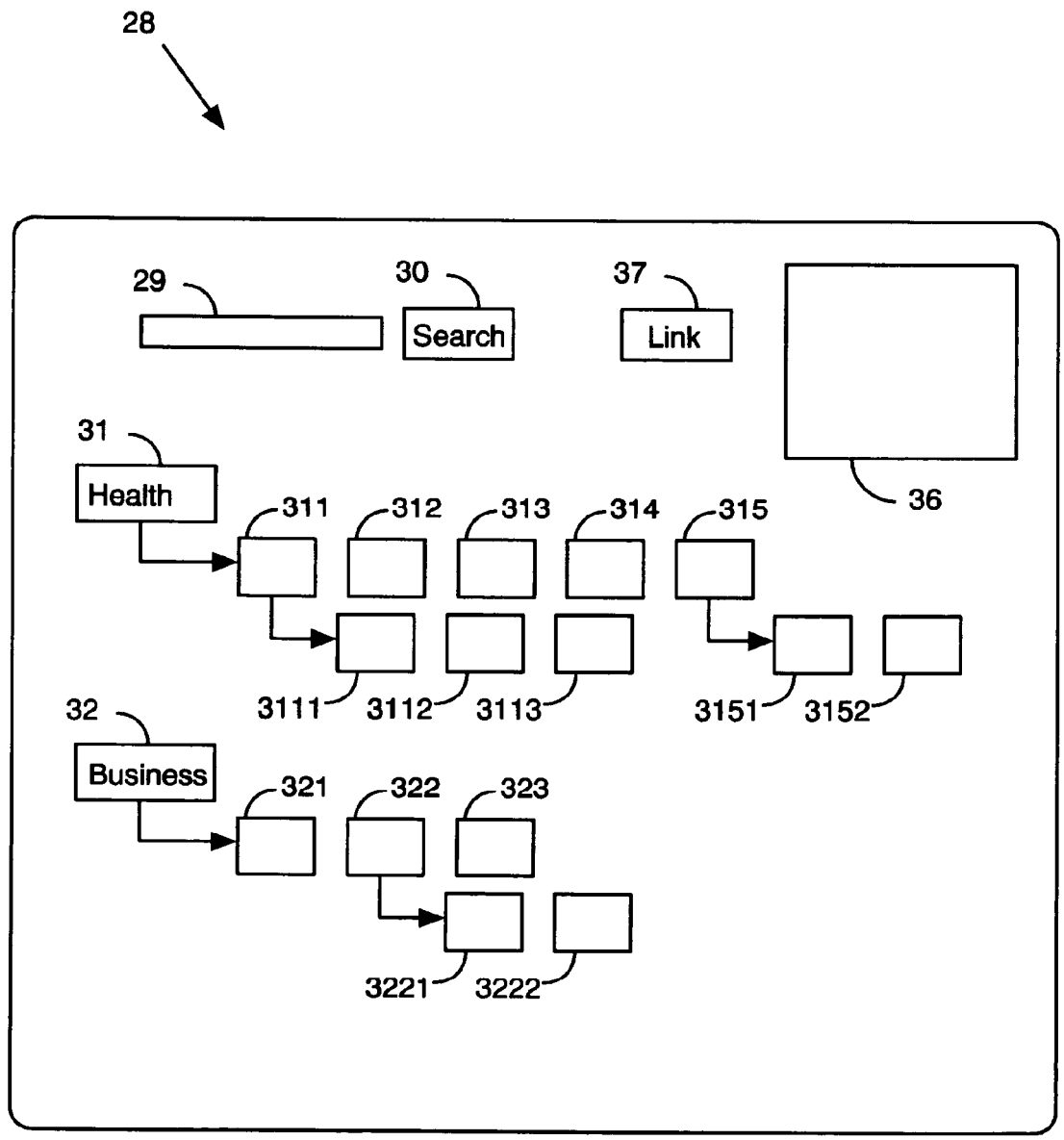
FIG. 4 is an illustration of an alternative preferred embodiment of a search results screen which displays stations, channels, programs, and a selectable multimedia display window.

In FIG. 4, an alternative preferred embodiment of the network platform system is shown. In this embodiment, the search results include station 31, which is directed to health related subject matter. The station 31 also has channels 311-315. Channel 311 has three programs 3111-3113 attached to it, and channel 315 has programs 3151-3152 attached to it. The same structure is shown in regard to station 32, which is directed to business related subject matter. Station 32 has channels 321-323 attached to it, and channel 322 has stations 3221 and 3222 attached to it.

The user may select program 3111, which for the sake of example may be an audio file. The user can select the audio file and program 3111 which will then be played through the sound system on the computer. The user may then decide to link to the Web site which streamed the audio file to it by selecting button 37. Likewise, if the program 3151 is an icon which points to the multimedia file on another Web site, the user can select the icon which will then display the multimedia file in window 36. After watching the multimedia presentation, the user may decide to link to the Web site which streamed the multimedia file to the user for display on the search results screen 28.

The following example illustrates a preferred embodiment of the numerical indexing used to identify and select stations, channels, and programs:

EXAMPLE 1

Yahoo Corporation with Multiple Document Entries Under Station 1

| Yahoo.com | Home | Station 1 |
| Yahoo.com/shopping | Online Mall | Channel 1.1 |
| Yahoo.com/BillPay | Pill Paying Svc. | Channel 1.2 |
| Yahoo.com/BillPay/Phone | Phone Bills | Program 1.2.1 |
| Yahoo.com/BillPay/Electric | Electric Bills | Program 1.2.2 |
| Yahoo.com/Broadcast | Online Videos | Channel 1.3 |

The numerical indexing system illustrated above systematically organizes, and classifies data in a systematic manner so that it can receive multimedia and video content over the Internet in a format similar to that of a television. At the same time instead of advertising long document names they can advertise the station, channel, or program number.

Those skilled in the art will recognize that the stations, channels, and programs can be displayed on the search results screen 28 in any convenient manner, so long as the data is presented in an organized hierarchical manner such that a user is able to select a Web location and link directly to it, or in the alternative, the user can selectively display or play multimedia data on the search results screen and then decide whether or not to link to the external Web location after reviewing the multimedia presentation.

Figure 5:
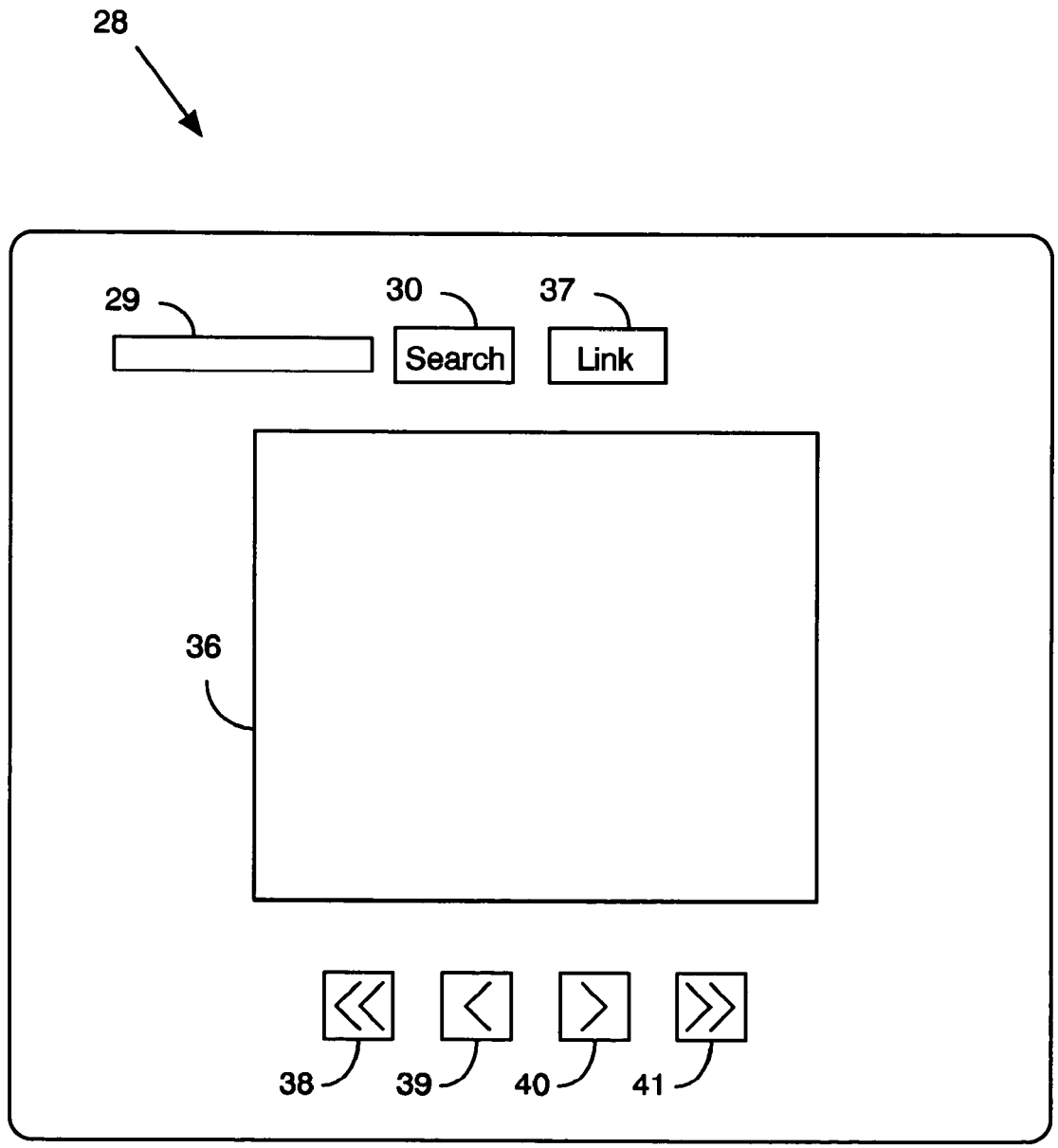
FIG. 5 illustrates another alternative preferred embodiment of a search results screen which displays individual multimedia search results in a multimedia display window. The multimedia files are automatically displayed and the user controls the stepping from one multimedia file to another.

In FIG. 5, another alternative preferred embodiment of the invention is shown. In this embodiment, the search screen 28 has an input window 29 to accept search parameters. Once the search parameters are entered, button 30 is selected to initiate a search. When the search is completed, the search results are presented as a multimedia file which is displayed in window 36. In this embodiment, the user steps forward and backward from one search result item to the next using forward and backward buttons 40 and 39, respectively. In addition, fast forward and fast reverse buttons 41 and 38, respectively, allow the searcher to move from one end of the search results list to the other end. Buttons 38-41 operate in the same manner as the forward and reverse buttons used on conventional recording devices such as cassette recorders and VCRs.

Once the user decides that a particular multimedia file displayed in window 36 is of interest, the user can then select link button 37 to link directly to the Web site which has supplied that multimedia file. This embodiment provides a pure multimedia search results list which allows the searcher to directly review multimedia search results without an intermediate step such as reading through text or selecting icons. Of course, this direct multimedia search capability could be combined with other search results such as listings and icon listings. This combined listing capability can easily be implemented by segmenting the search display screen.

Figure 6:
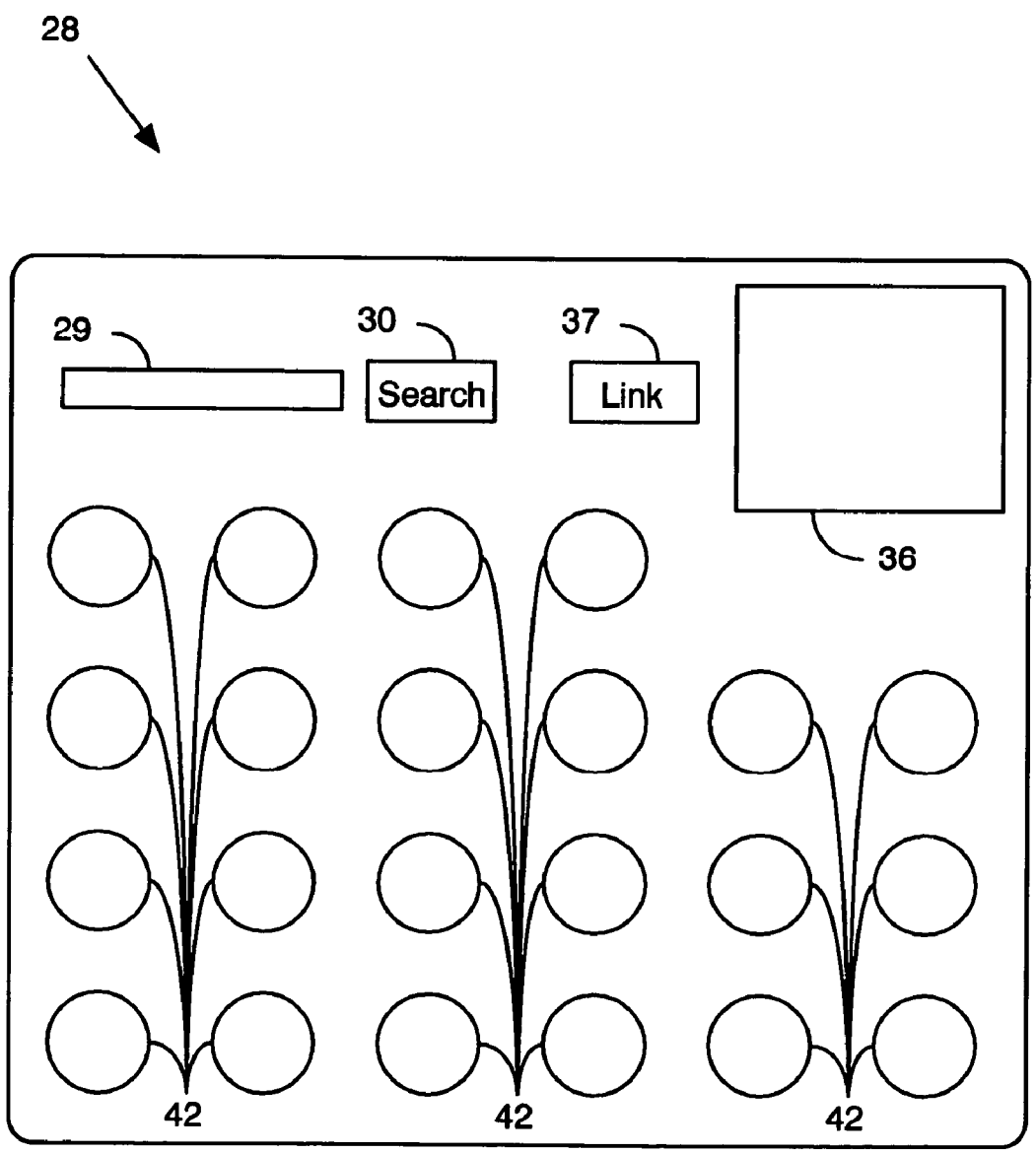
FIG. 6 illustrates yet another alternative preferred embodiment of a search results screen which displays individual multimedia search results in a multimedia display window. The multimedia files are displayed by selecting an icon on the search results display screen.

FIG. 6 illustrates another preferred embodiment. In this embodiment, the search results are displayed as a series of icons 42. When the searcher selects an icon 42, the meta tag data associated with the icon is used to access the multimedia file which is then displayed on the search results screen window 36. After review of the multimedia file, the searcher can decide whether or not to link to the remote Web site associated with the icon. If the searcher decides to link to the remote Web site, the link button 37 is selected to initiate the transfer.

While the invention has been described with respect to a preferred embodiment thereof, it will be understood by those skilled in the art that various changes in detail may be made therein without departing from the spirit, scope, and teaching of the invention. For example, the number of channels, their subject matter, the number of programs within the channel, etc., can vary. Likewise, the type and number of meta tags used by the client in the search engine can vary, etc. Accordingly, the invention herein disclosed is to be limited only as specified in the following claims

I claim:

1. A broadcast network search system, comprising:
a plurality of data sources, the data sources further comprising a plurality of data types including text, image, audio, video, multimedia, and/or icon data types representing at least one broadcast allocation node or sub-node in the broadcast network;
means to provide a virtual representation of a hierarchical network having entities and sub-entities;
a numerical indexing system for nodes and sub-nodes;
means to group the entities and sub-entities into the numerical indexing system; and
a multilevel numerical index having pre-assigned numerical index numbers related to specific broadcast allocation nodes and sub-nodes of data within a broadcast network;
a search engine with means to search the database based on the pre-assigned numerical index numbers;
means to search numerically assigned broadcast allocation nodes or sub-nodes;
means to input selected numerical index numbers to the search engine; and
display means to display the results of the search such that the search results include videos related to the numerical index numbers containing information describing the content of a URL;
whereby the search engine that can search a database using pre-assigned numbers related to specific nodes and sub-nodes of data within at least one broadcast network, and display videos containing information describing the content of an associated URL.

2. A system, as in claim 1, further comprising:
metadata, each metadata item further associated with a particular data type, and further containing information related to the plurality of data sources including text, audio, video, multimedia or pre-assigned numerical index numbers;
means to optionally define a category or a sub-category which the broadcast allocation nodes and sub-nodes should be associated with; and
displaying the results of a search using text, audio, video, multimedia or preassigned numerical index numbers;
whereby a search can be conducted in the database consisting of at least one broadcast network containing at least one broadcast allocation node or sub-node.

3. A system, as in claim 2, further comprising:
means for a client to gather information from the metadata associated to one or more broadcast allocation nodes or sub-nodes; and
means for the client to update information in the metadata under control of a client;
whereby the client determines the contents of the metadata.

4. A system, as in claim 2, further comprising:
icons related to a variety of data types including text, icon, audio, video, and/or multimedia, the icons further defined under control of data in the metadata;
means to display the icons as part of the search results; and
means to select a search result entry by selecting an icon;
whereby an entry in the search results can be selected by selecting the icon.

5. A system, as in claim 4, further comprising:
means to broadcast video or multimedia data from a remote server to a broadcast allocation node or sub-node;
means to provide at least one playlist under a broadcast allocation node or sub-node;
at least one icon related to video or multimedia data is further associated with location information related to the video or multimedia data;
a multimedia window, the multimedia window simultaneously presented with the search results entries; and
means to display video or multimedia data by selecting an icon related to that multimedia data from the search results entries;
whereby multimedia data related to a search entry can be streamed to the search results and displayed in the multimedia window without linking to the remote URL.

6. A system, as in claim 5, further comprising:
means to selectively link to a remote URL after the multimedia data has been displayed with the search results.

7. A system, as in claim 2, further comprising:
means to selectively categorize search results by using user input related to the metadata to filter the search results; and
means to filter within the filtered search results;
whereby a user can search the database for broadcast network nodes by category, then search within the category to refine the results set.

* * * * *

UNITED STATES PATENT AND TRADEMARK OFFICE
CERTIFICATE OF CORRECTION

| | | |
|---|---|---|
| PATENT NO. | : 7,865,498 B2 | |
| APPLICATION NO. | : 10/252806 | |
| DATED | : January 4, 2011 | |
| INVENTOR(S) | : Alex Fiero | |

It is certified that error appears in the above-identified patent and that said Letters Patent is hereby corrected as shown below:

On the Title Page, Item (75) the inventor name on the patent is listed as Alex Rodriquez. That is incorrect. The correct inventor name should be Alex Fiero.

Signed and Sealed this
Thirty-first Day of May, 2011

David J. Kappos
*Director of the United States Patent and Trademark Office*